US012604306B2

(12) United States Patent
Cheng

(10) Patent No.: US 12,604,306 B2
(45) Date of Patent: Apr. 14, 2026

(54) METHOD, SYSTEM AND USER EQUIPMENT FOR SCEDULING REQUEST TRANSMISSION

(71) Applicant: MEDIATEK INC., Hsinchu (TW)

(72) Inventor: Ming-Yuan Cheng, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 427 days.

(21) Appl. No.: 18/325,222

(22) Filed: May 30, 2023

(65) Prior Publication Data

US 2024/0008026 A1 Jan. 4, 2024

Related U.S. Application Data

(60) Provisional application No. 63/367,627, filed on Jul. 4, 2022.

(51) Int. Cl.
*H04W 72/12* (2023.01)
*H04W 72/21* (2023.01)

(52) U.S. Cl.
CPC ........... *H04W 72/12* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2018/0054755 A1* | 2/2018 | Lee | H04W 72/21 |
| 2019/0014606 A1* | 1/2019 | Li | H04W 88/04 |
| 2020/0281012 A1* | 9/2020 | Behravan | H04W 72/1268 |
| 2021/0259019 A1* | 8/2021 | Hassan | H04W 72/23 |
| 2021/0289391 A1* | 9/2021 | Paladugu | H04W 88/04 |
| 2021/0298034 A1* | 9/2021 | He | H04W 72/56 |

* cited by examiner

*Primary Examiner* — Michael J Moore, Jr.
*Assistant Examiner* — Gautam Sharma
(74) *Attorney, Agent, or Firm* — McClure, Qualey & Rodack, LLP

(57) ABSTRACT

A method for scheduling request (SR) transmission is provided. The method may include the following steps. A first user equipment (UE) may transmit an indication for data transmission to a second UE. The second UE may transmit an SR to a network node based on the indication before receiving data from the first UE.

16 Claims, 6 Drawing Sheets

100

200

Transmitting, by a first UE, an indication for data transmission to a second UE ⌐S510

Transmitting, by the second UE, a SR to a network node based on the indication before receiving data from the first UE ⌐S520

Receiving an indication for data
transmission from another UE ⸺ S610

Transmitting a SR to a network node
based on the indication before receiving
data from the another UE ⸺ S620

METHOD, SYSTEM AND USER EQUIPMENT FOR SCEDULING REQUEST TRANSMISSION

CROSS REFERENCE TO RELATED APPLICATIONS

This application claims the benefits of U.S. Provisional Application No. 63/367,627 filed on Jul. 4, 2022, the entirety of which is incorporated by reference herein.

BACKGROUND OF THE INVENTION

Field of the Invention

The invention generally relates to scheduling request (SR) transmission technology, and more particularly, to SR transmission technology in which an SR is transmitted to the network node in advance of the UE obtaining the uplink (UL) data.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is 5G New Radio (NR), which is a set of enhancements to the LTE mobile standard promulgated by the Third Generation Partnership Project (3GPP). It is designed to better support mobile broadband Internet access by improving spectral efficiency, reducing costs, and improving services.

In conventional technology, when a UE needs to transmit uplink (UL) data to a network, the UE may need to wait until the data has first been generated and stored in a data buffer. That is, only once the UE has obtained the UL data can the UE transmit the scheduling request (SR) to the network node. Then, the UE must wait for a UL grant for the SR from the network node. The delay between the SR and the UL grant needs to be reduced.

Therefore, how to reduce the delay between the SR and the UL grant is a topic that is worthy of discussion.

BRIEF SUMMARY OF THE INVENTION

A method, system, and user equipment (UE) for scheduling request (SR) transmission are provided to overcome the problems mentioned above.

An embodiment of the invention provides a method for scheduling request (SR) transmission. The method may comprise the following steps. A first user equipment (UE) may transmit an indication for data transmission to a second UE. The second UE may transmit an SR to a network node based on the indication before receiving data from the first UE.

In some embodiments of the invention, in the method, the second UE may receive the data from the first UE after the second UE transmits the SR to the network node. Then, the network node may transmit an uplink (UL) grant for the SR to the second UE. Then, the second UE may transmit the data to the network node.

In some embodiments of the invention, in the method, the network node may transmit an uplink (UL) grant for the SR to the second UE. Then, the second UE may transmit a buffer status report (BSR) to the network node in response to the second UE not receiving the data from the first UE.

In some embodiments of the invention, the first UE may transmit the indication to the second UE through a Wi-Fi, a bluetooth (BT), sidelink or a cable.

In some embodiments of the invention, the indication may comprise at least one of traffic profile and quality of service (QoS) information.

In some embodiments of the invention, the first UE may be an augmented reality (AR) glasses.

An embodiment of the invention provides a system for scheduling request (SR) transmission. The system may comprise a first user equipment (UE), a second UE and a network node. The first UE may transmit an indication for data transmission to the second UE. The second UE may transmit an SR to a network node based on the indication before receiving data from the first UE.

An embodiment of the invention provides a method for scheduling request (SR) transmission. The method comprises the following steps. A transceiver of user equipment (UE) may receive an indication for data transmission from another UE. The transceiver may transmit an SR to a network node based on the indication before receiving data from the UE which transmits the indication.

An embodiment of the invention provides user equipment (UE) for scheduling request (SR) transmission. The UE may comprise a transceiver and a processor. The transceiver may receive an indication for data transmission from another UE. The processor may be coupled to the transceiver. The processor may determine to transmit, via the transceiver, an SR to a network node based on the indication before receiving data from the UE which transmits the indication.

Other aspects and features of the invention will become apparent to those with ordinary skill in the art upon review of the following descriptions of specific embodiments of the methods, system and UE for SR transmission.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
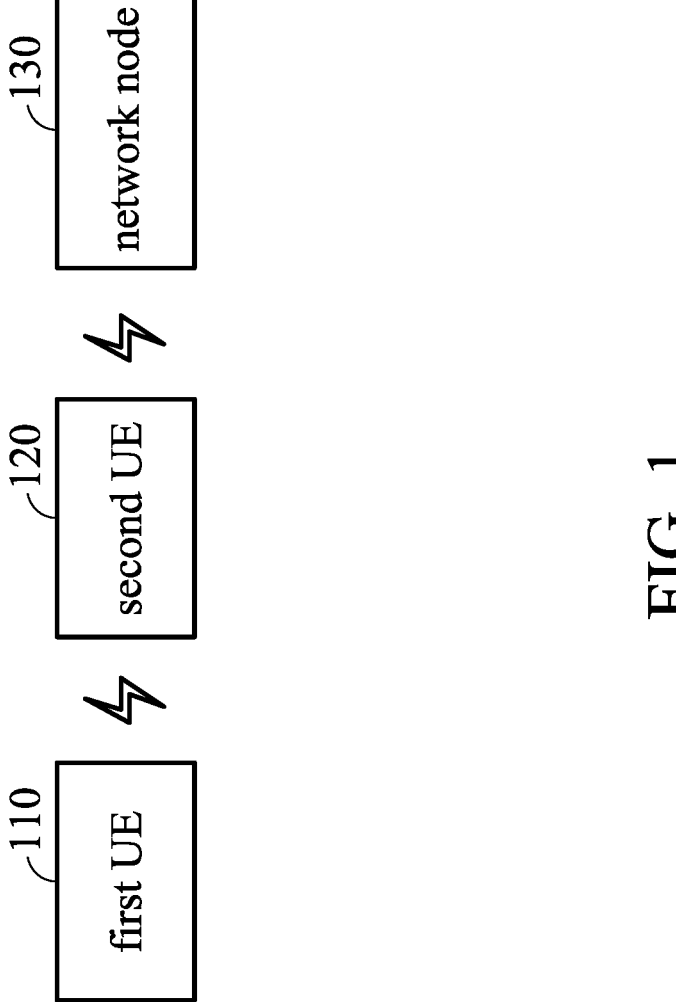
FIG. 1 is a block diagram of a wireless communications system 100 according to an embodiment of the invention.

FIG. 1 is a block diagram of a wireless communications system 100 according to an embodiment of the invention. As shown in FIG. 1, the wireless communications system 100 may comprise a first user equipment (UE) 110, a second UE 120 and a network node 130. It should be noted that in order to clarify the concept of the invention, FIG. 1 presents a simplified block diagram in which only the elements relevant to the invention are shown. However, the invention should not be limited to what is shown in FIG. 1.

In an embodiment of the invention, the first UE 110 may be a augmented reality (AR) glasses or other devices with lower capability, i.e., these device cannot directly transmit data to the network node 130.

In the embodiments of the invention, the second UE 120 may be a head-mounted display (HMD), a smartphone, Personal Data Assistant (PDA), pager, laptop computer, desktop computer, wireless handset, or any computing device that includes a wireless communications interface to communicate with network node 130. The second UE 120 may communicate with the first UE 110 through a communication link, e.g., a Wi-Fi, a bluetooth (BT), sidelink and a cable, but the invention should not be limited thereto.

In the embodiments, the network node 130 may be a base station, a gNodeB (gNB), a NodeB (NB) an eNodeB (eNB), an access point, an access terminal, but the invention should not be limited thereto. In the embodiments, the second UE 120 may communicate with the network node 130 through the fourth generation (4G) communication technology, fifth generation (5G) communication technology or 5G New Radio (NR) communication technology, but the invention should not be limited thereto.

Figure 2:
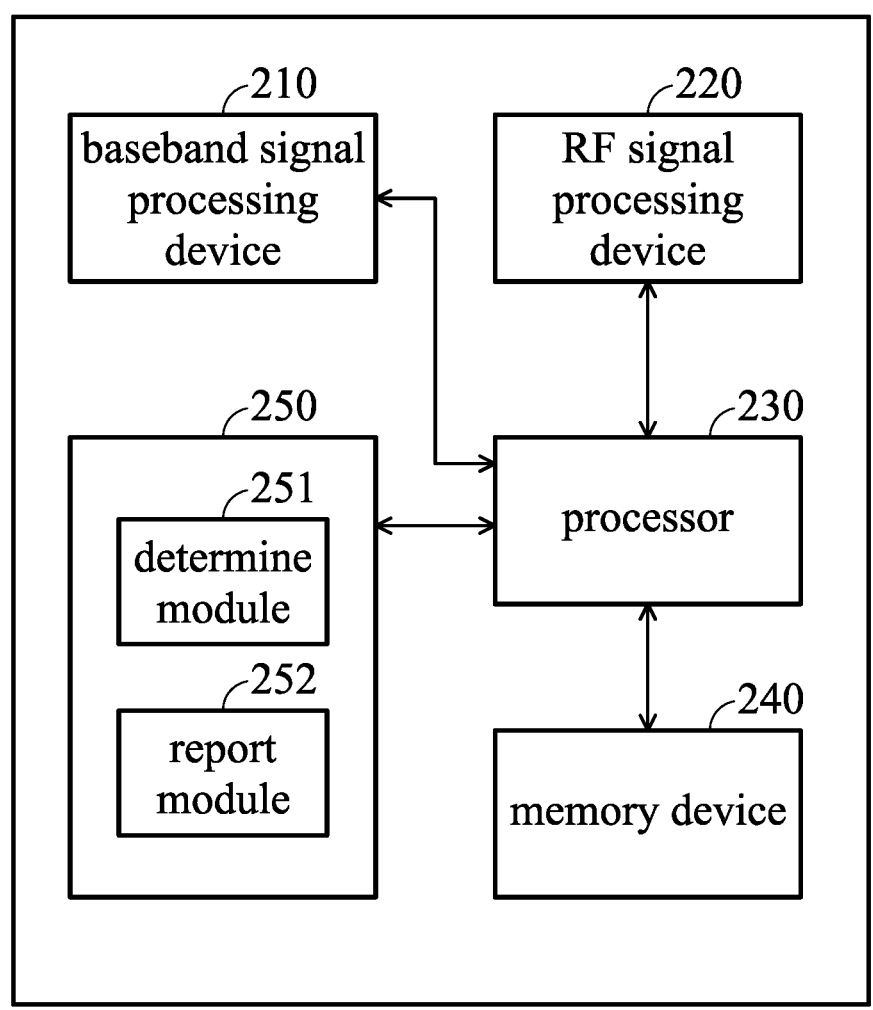
FIG. 2 is a block diagram of a UE 200 according to an embodiment of the invention.

FIG. 2 is a block diagram of a UE 200 according to an embodiment of the invention. The UE 200 can be applied to the second UE 120 of FIG. 1. As shown in FIG. 2, the UE 200 may comprise at least a baseband signal processing device 210, a radio frequency (RF) signal processing device 220, a processor 230, a memory device 240, and function modules and circuits 250. It should be noted that in order to clarify the concept of the invention, FIG. 2 presents a simplified block diagram in which only the elements relevant to the invention are shown. However, the invention should not be limited to what is shown in FIG. 2.

The RF signal processing device 220 may be a transceiver. The RF signal processing device 220 may comprise a plurality of antennas to receive or transmit RF signals. The RF signal processing device 220 may receive RF signals via the antennas and process the received RF signals to convert the received RF signals to baseband signals to be processed by the baseband signal processing device 210, or receive baseband signals from the baseband signal processing device 210 and convert the received baseband signals to RF signals to be transmitted to a peer communications apparatus. The RF signal processing device 220 may comprise a plurality of hardware elements to perform radio frequency conversion. For example, the RF signal processing device 220 may comprise a power amplifier, a mixer, analog-to-digital converter (ADC)/digital-to-analog converter (DAC), etc.

The baseband signal processing device 210 may further process the baseband signals to obtain information or data transmitted by the peer communications apparatus. The baseband signal processing device 210 may also comprise a plurality of hardware elements to perform baseband signal processing.

The processor 230 may control the operations of the baseband signal processing device 210, the RF signal processing device 220, the memory device 240 and the function modules and circuits 250. According to an embodiment of the invention, the processor 230 may also be arranged to execute the program codes of the software module(s) of the corresponding baseband signal processing device 210 and/or the RF signal processing device 220. The program codes accompanied by specific data in a data structure may also be referred to as a processor logic unit or a stack instance when being executed. Therefore, the processor 230 may be regarded as being comprised of a plurality of processor logic units, each for executing one or more specific functions or tasks of the corresponding software modules.

According to an embodiment of the invention, the RF signal processing device 220 and the baseband signal processing device 210 may collectively be regarded as a radio module capable of communicating with a wireless network to provide wireless communications services in compliance with a predetermined Radio Access Technology (RAT). Note that, in some embodiments of the invention, the UE 200 may be extended further to comprise more than one antenna and/or more than one radio module, and the invention should not be limited to what is shown in FIG. 2.

The memory device 240 may store the software and firmware program codes, system data, user data, etc. of the UE 200. The memory device 240 may be a volatile memory such as a Random Access Memory (RAM); a non-volatile memory such as a flash memory or Read-Only Memory (ROM); a hard disk; or any combination thereof.

The function modules and circuits 250 may comprise a determine module 251 and a report module 252. The processor 230 may execute different modules or circuits in the function modules and circuits 250 to perform embodiments of the present invention. In the embodiment of the invention, the determine module 251 may determine to transmit a scheduling request (SR) to the network node based on an indication from another UE. The report module 252 may transmit SR and data to the network node.

According to an embodiment of the invention, the baseband signal processing device 210 and the RF signal processing device 220 may be configured in a modem (MD) of the UE 200, and the processor 230 may be configured in an application processor (AP) of the UE 200. According to an embodiment of the invention, the function modules and circuits 250 may be configured in the modem or AP of the UE 200.

Figure 3:
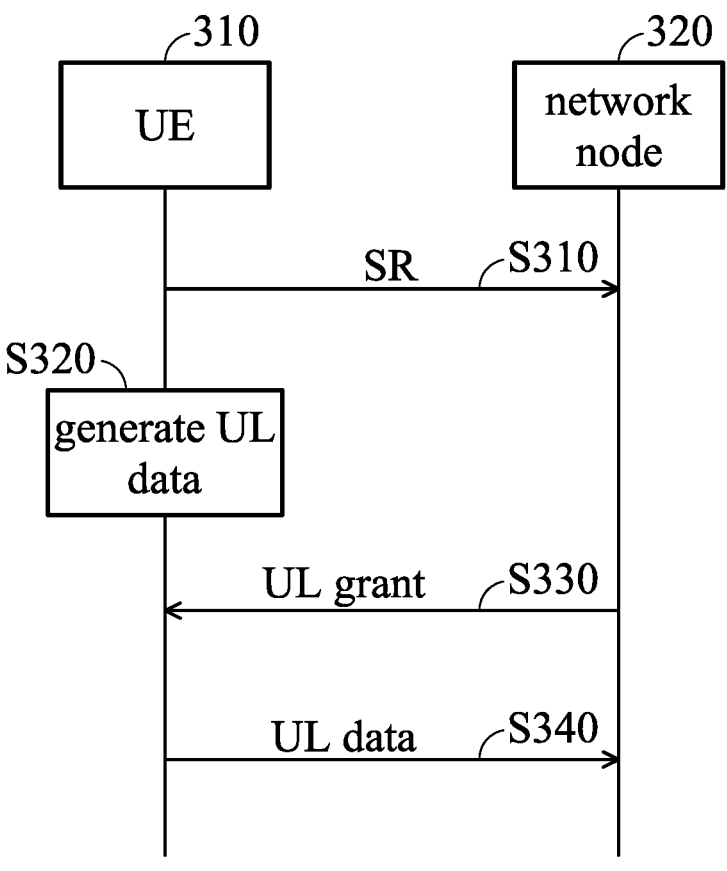
FIG. 3 is a schematic diagram illustrating an SR transmission during a modification period according to an embodiment of the invention.

FIG. 3 is a schematic diagram illustrating an SR transmission during a modification period according to an embodiment of the invention. In the embodiment, the UE 310 can be applied to the second UE 120 of FIG. 1, and the network node 320 can be applied to the network node 130 of FIG. 1. As shown in FIG. 3, in step S310, when the application processor (AP) of UE knows that uplink (UL) data will be generated, but there is no UL resource for transmitting the UL data, the AP of UE 310 may transmit an indication to the modem (MD) of the UE 310 to request the MD of the UE 310 to send a scheduling request (SR) to the network node 320 in advance. Specifically, in some applications, the UL packets of these applications may be generated periodically. Therefore, the AP of the UE 310 may know that UL data will be generated in a while. Therefore, before the UL data has been generated and stored in the data buffer (e.g., layer 2 buffer (L2 buffer)) of the UE 310, the AP of the UE 310 may transmit the indication to the MD of the UE 310 to request the MD of the UE 310 to send SR for the UL data transmission to the network node 320 in advance. The SR request can be used to request the UL resource for transmitting the UL data.

In step S320, the UL data has been generated and stored in the data buffer of the UE 310.

In step S330, the UE 310 may receive a UL grant for the SR from the network 320.

In step S340, the UE 310 may transmit the generated UL data to the network node 320.

In the embodiment, in another example, when the UE 310 has received a UL grant for the SR from the network 320, but the UE 310 has not generated the UL data (i.e., step S330 has occurred, but S320 has not occurred), in step S340, the UE 310 may transmit a buffer status report (BSR) to the network node 320 to keep the UL grant. Then, when the second UE 310 has generated the UL data, the UE 310 may transmit the UL data to the network node 320.

Figure 4:
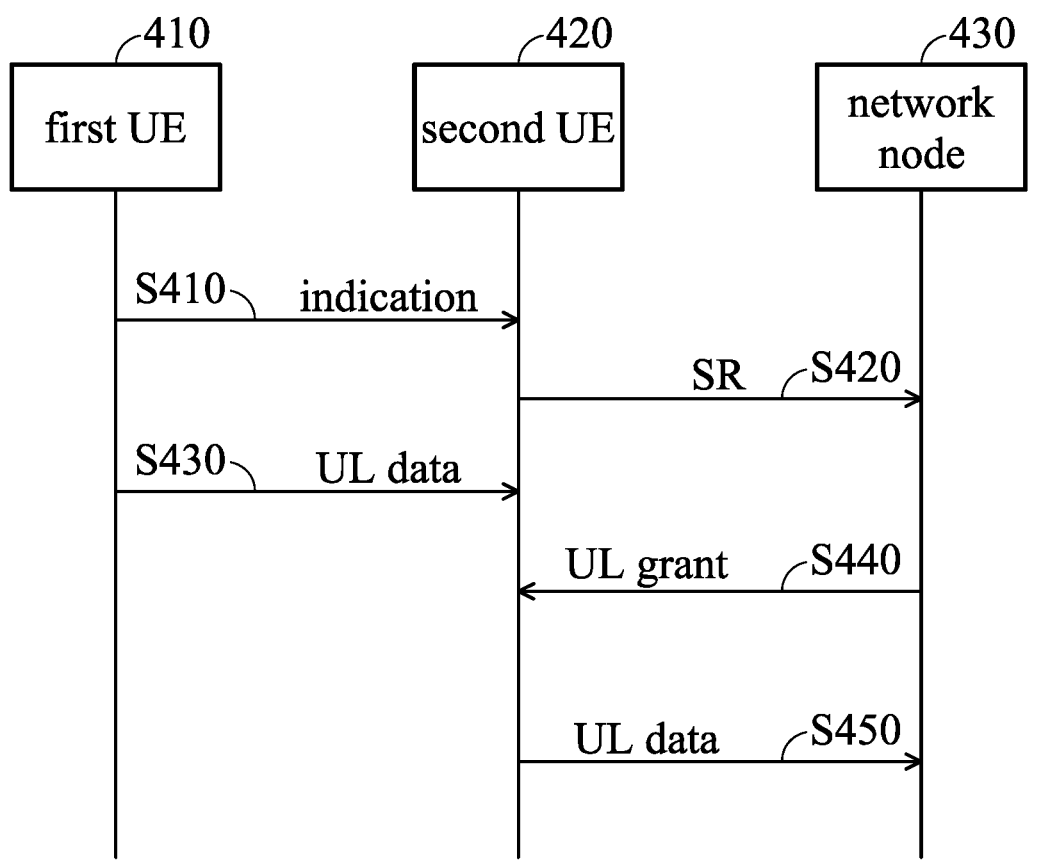
FIG. 4 is a schematic diagram illustrating an SR transmission during a modification period according to another embodiment of the invention.

FIG. 4 is a schematic diagram illustrating an SR transmission during a modification period according to another embodiment of the invention. In the embodiment, the first UE 410 can be applied to first UE 110 of FIG. 1, the second UE 420 can be applied to the second UE 120 of FIG. 1, and the network node 430 can be applied to network node 130 of FIG. 1. The transmissions in FIG. 4 can be regarded a tethering transmission mechanism. As shown in FIG. 4, in step S410, when the first UE 410 knows that uplink (UL) data will be generated, the first UE 410 may transmit an indication to the second UE 420. Specifically, in some applications, the UL packets of these applications may be generated periodically. Therefore, the first UE 410 may know that UL data will be generated in a while.

In an embodiment of the invention, the indication from the first UE 410 may comprise traffic profile, quality of service (QoS) information, and/or other related information of the UL data which will be generated. The traffic profile may comprise data rate, packet size, packet format, packet arrive rate, jitter value, packet delay budget (PDB), reliability requirement, and so on. The QoS information may comprise the settings of service class, network control, internetwork control telephony, voice admit, signaling, real time interactive, broadcast video, multimedia conferencing, multimedia streaming, low priority, low latency data, Operations, Administration, and Management (OAM), standard, high throughput data, and so on.

In step S420, when there is no UL resource for transmitting the UL data, the second UE 420 may transmit an SR for UL data transmission to the network node 430 in advance based on the indication from the first UE 410 before the second UE 420 has received the UL data and stored the UL data in the data buffer (e.g., layer 2 buffer (L2 buffer)) of the second UE 420.

In step S430, when the first UE 410 has generated the UL data, the second UE 420 may receive the UL data from the first UE 410.

In step S440, the second UE 420 may receive a UL grant for the SR from the network node 430.

In step S450, the second UE 420 may transmit the UL data generated by the first UE 440 to the network node 430.

In the embodiment, in another example, when the second UE 420 has received a UL grant for the SR from the network node 430, but still has not received the UL data from the first UE 410 (i.e., step S440 has occurred, but S430 has not occurred), in step S450, the second UE 420 may transmit a buffer status report (BSR) to the network node 430 to keep the UL grant. Then, when the second UE 420 has received the UL data from the first UE 410, the second UE 420 may transmit the UL data generated by the first UE 440 to the network node 430.

Figure 5:
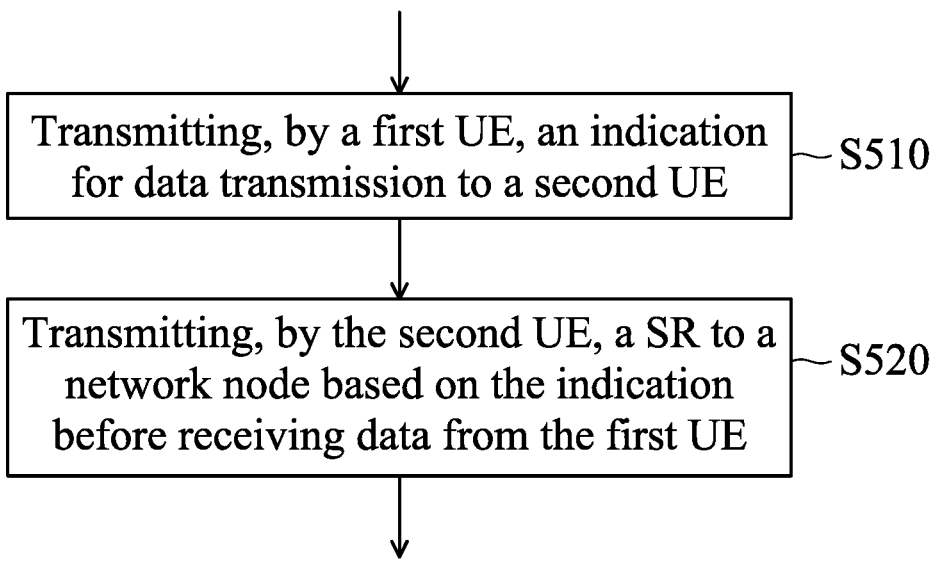
FIG. 5 is a flow chart illustrating a method for SR transmission according to an embodiment of the invention.

FIG. 5 is a flow chart illustrating a method for scheduling request (SR) transmission according to an embodiment of the invention. The method can be applied to the wireless communications system 100. As shown in FIG. 5, in step S510, the first UE 110 may transmit an indication for data transmission to the second UE 120.

In step S520, the second UE 120 may transmit an SR to the network node 130 based on the indication before receiving data from the first UE 110.

In some embodiments, in the method, the second UE 120 may further receive the data from the first UE 110 after the second UE 120 transmits the SR to the network node 130. The network node 130 may further transmit an uplink (UL) grant for the SR to the second UE 120. Then, the second UE 120 may further transmit the data to the network node 130.

In some embodiments, in the method, the network node 130 may further transmit an uplink (UL) grant for the SR to the second UE. In addition, the second UE 120 may further transmit a buffer status report (BSR) to the network node 130 in response to the second UE 120 not receiving the data from the first UE 110.

In some embodiments, in the method, the first UE 110 may transmit the indication to the second UE through a Wi-Fi, a bluetooth (BT), sidelink or a cable.

Figure 6:
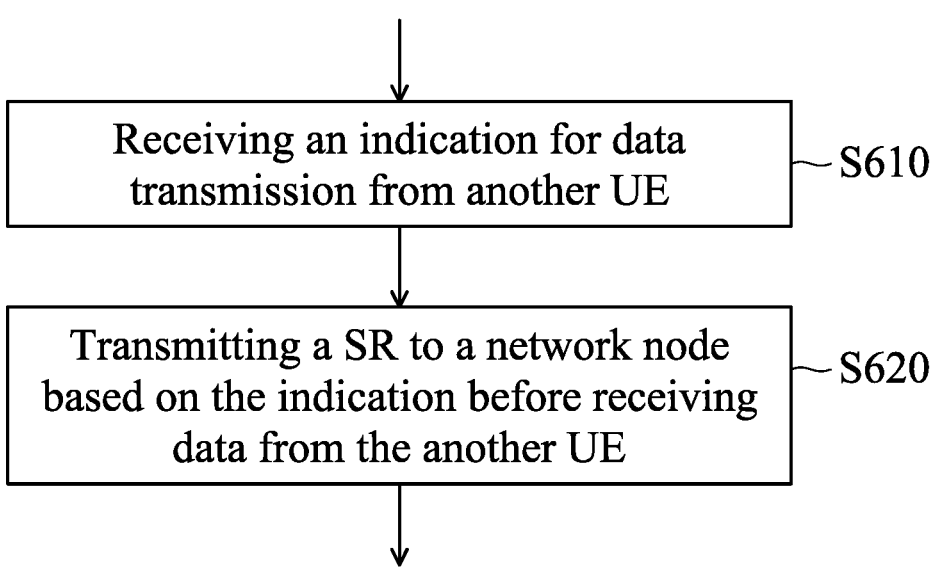
FIG. 6 is a flow chart illustrating a method for SR transmission according to another embodiment of the invention.

FIG. 6 is a flow chart illustrating a method for scheduling request (SR) transmission according to another embodiment of the invention. The method can be applied to the second UE 120 of the wireless communications system 100. As shown in FIG. 6, in step S610, the second UE 120 may receive an indication for data transmission from another UE (e.g., the first UE 110).

In step S620, the second UE 120 may transmit an SR to the network node 130 based on the indication before receiving data from the UE (e.g., the first UE 110) which transmits the indication to the UE 120.

In some embodiments, in the method, after transmitting the SR to the network node 130, the second UE 120 may further receive the data from the UE (e.g., the first UE 110) which transmits the indication to the UE 120. The second UE 120 may further receive an uplink (UL) grant for the SR from the network node 130. In addition, the second UE 120 may further transmit the data to the network node 130.

In some embodiments, in the method, the second UE 120 may further receive an uplink (UL) grant for the SR from the network node 130. In addition, the UE 120 may further transmit a buffer status report (BSR) to the network node in response to the second UE 120 not receiving the data from the UE (e.g., the first UE 110) which transmits the indication to the UE 120.

In the methods for SR transmission provided in the invention, the UE may transmit the SR to the network node before obtaining the UL data. Then, when the UE receive the UL grant for the SR, the UE may transmit the obtained data to the network node. Therefore, the delay between the SR and UL grant will be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for scheduling request (SR) transmission, comprising:
   transmitting, by a first user equipment (UE), an indication for data transmission to a second UE; and
   transmitting, by the second UE, an SR to a network node based on the indication before receiving data from the first UE,
   wherein the method further comprises:
   transmitting, by the network node, an uplink (UL) grant for the SR to the second UE; and
   transmitting, by the second UE, a buffer status report (BSR) to the network node in response to the second UE not receiving the data from the first UE.

2. The method of claim 1, further comprising:
   receiving, by the second UE, the data from the first UE after the second UE transmits the SR to the network node;
   transmitting, by the network node, an uplink (UL) grant for the SR to the second UE; and
   transmitting, by the second UE, the data to the network node.

3. The method of claim 1, wherein the transmitting of the indication further comprises:
   transmitting, by the first UE, the indication to the second UE through a Wi-Fi, a bluetooth (BT), sidelink or a cable.

4. The method of claim 1, wherein the indication comprises at least one of traffic profile and quality of service (QoS) information.

5. The method of claim 1, wherein the first UE is an augmented reality (AR) glasses.

6. A system for scheduling request (SR) transmission, comprising:
   a first user equipment (UE);
   a second UE, communicating with the first UE via a communication link; and
   a network node, wirelessly communicating with the second UE,
   wherein the first UE transmits an indication for data transmission to the second UE; and
   wherein the second UE transmits an SR to a network node based on the indication before receiving data from the first UE,
   wherein the network node transmits an uplink (UL) grant for the SR to the second UE, and the second UE transmits a buffer status report (BSR) to the network node in response to the second UE not receiving the data from the first UE.

7. The system of claim 6, wherein the second UE receives the data from the first UE after the second UE transmits the SR to the network node, the network node transmits an uplink (UL) grant for the SR to the second UE, and the second UE transmits data to the network node.

8. The system of claim 6, wherein the communication link comprises a Wi-Fi, a bluetooth (BT), sidelink and a cable.

9. The system of claim 6, wherein the indication comprises at least one of traffic profile and quality of service (QoS) information.

10. The system of claim 6, wherein the first UE is an augmented reality (AR) glasses.

11. A method for scheduling request (SR) transmission, comprising:
   receiving, by a transceiver of a user equipment (UE), an indication for data transmission from another UE; and
   transmitting, by the transceiver, an SR to a network node based on the indication before receiving data from the another UE,
   wherein the method further comprises:
   receiving, by the transceiver, an uplink (UL) grant for the SR from the network node; and
   transmitting, by the transceiver, a buffer status report (BSR) to the network node in response to the second UE not receiving the data from the first UE.

12. The method of claim 11, further comprising:
   receiving, by the transceiver, the data from the another UE after transmitting the SR to the network node;
   receiving, by the transceiver, an uplink (UL) grant for the SR from the network node; and
   transmitting, by the transceiver, the data to the network node.

13. The method of claim 11, wherein the indication comprises at least one of traffic profile and quality of service (QoS) information.

14. A user equipment (UE) for scheduling request (SR) transmission, comprising:

a transceiver, receiving an indication for data transmission from another UE; and a processor, coupled to the transceiver and determining to transmit, via the transceiver, an SR to a network node based on the indication before receiving data from the another UE, wherein the transceiver receives an uplink (UL) grant for the SR from the network node, and the transceiver transmits a buffer status report (BSR) to the network node in response to the UE not receiving the data from the another UE.

15. The UE of claim 14, wherein the transceiver receives the data from the another UE after transmitting the SR to the network node, the transceiver receives an uplink (UL) grant for the SR from the network node, and the transceiver transmits data to the network node.

16. The UE of claim 14, wherein the indication comprises at least one of traffic profile and quality of service (QoS) information.

* * * * *